(12) United States Patent
Ambardekar et al.

(10) Patent No.: US 11,487,342 B2
(45) Date of Patent: *Nov. 1, 2022

(54) REDUCING POWER CONSUMPTION IN A NEURAL NETWORK ENVIRONMENT USING DATA MANAGEMENT

(71) Applicant: MICROSOFT TECHNOLOGY LICENSING, LLC, Redmond, WA (US)

(72) Inventors: Amol Ashok Ambardekar, Redmond, WA (US); Chad Balling McBride, North Bend, WA (US); George Petre, Redmond, WA (US); Kent D. Cedola, Bellevue, WA (US); Larry Marvin Wall, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,379

(22) Filed: Apr. 16, 2021

(65) Prior Publication Data

US 2021/0232205 A1  Jul. 29, 2021

Related U.S. Application Data

(63) Continuation of application No. 15/847,785, filed on Dec. 19, 2017, now Pat. No. 10,996,739.

(51) Int. Cl.
*G06N 3/04* (2006.01)
*G06N 3/08* (2006.01)
(Continued)

(52) U.S. Cl.
CPC .......... *G06F 1/3243* (2013.01); *G06F 1/3275* (2013.01); *G06N 3/04* (2013.01);
(Continued)

(58) Field of Classification Search
CPC ...... G06F 1/3243; G06F 1/3275; G06F 17/16; G06N 3/04; G06N 3/0454; G06N 3/063; G06N 3/08
(Continued)

(56) References Cited

U.S. PATENT DOCUMENTS 10,996,739 B2 * 5/2021 Ambardekar ......... G06F 1/3243
2008/0122662 A1 * 5/2008 Hu ....................... H03M 7/4006
341/51

(Continued)

OTHER PUBLICATIONS

"Office Action Issued in European Patent Application No. 18816461.0", dated Mar. 14, 2022, 6 Pages.
U.S. Appl. No. 15/847,785, filed Dec. 19, 2017.

*Primary Examiner* — Ly D Pham
(74) *Attorney, Agent, or Firm* — Newport IP, LLC; Han K. Gim

(57) ABSTRACT

Techniques to provide for improved (i.e., reduced) power consumption in an exemplary neural network (NN) and/or Deep Neural Network (DNN) environment using data management. Improved power consumption in the NN/DNN may be achieved by reducing a number of bit flips needed to process operands associated with one or more storages. Reducing the number bit flips associated with the NN/DNN may be achieved by multiplying an operand associated with a first storage with a plurality of individual operands associated with a plurality of kernels of the NN/DNN. The operand associated with the first storage may be neuron input data and the plurality of individual operands associated with the second storage may be weight values for multiplication with the neuron input data. The plurality of kernels may be arranged or sorted and subsequently processed in a manner that improves power consumption in the NN/DNN.

20 Claims, 9 Drawing Sheets

(51) Int. Cl.
 *G06N 3/063* (2006.01)
 *G06F 17/16* (2006.01)
 *G06F 1/32* (2019.01)
 *G06F 1/3234* (2019.01)

(52) U.S. Cl.
 CPC .......... *G06N 3/0454* (2013.01); *G06N 3/063* (2013.01); *G06F 17/16* (2013.01); *G06N 3/08* (2013.01)

(58) Field of Classification Search
 USPC .......................................................... 706/26
 See application file for complete search history.

(56) References Cited

U.S. PATENT DOCUMENTS

2015/0358036 A1* 12/2015 Tseng .................. G06F 11/1012
 714/755
2018/0307968 A1* 10/2018 Bose .................... G06N 3/0472

\* cited by examiner

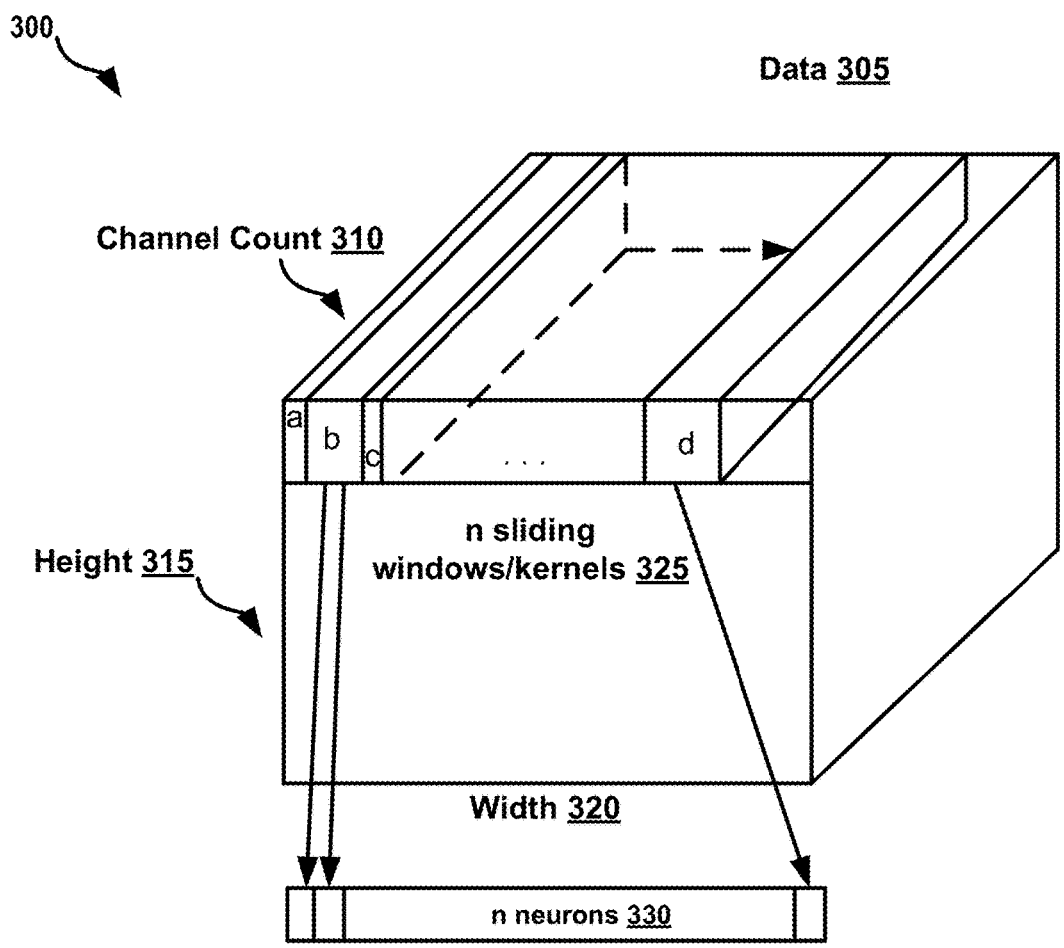
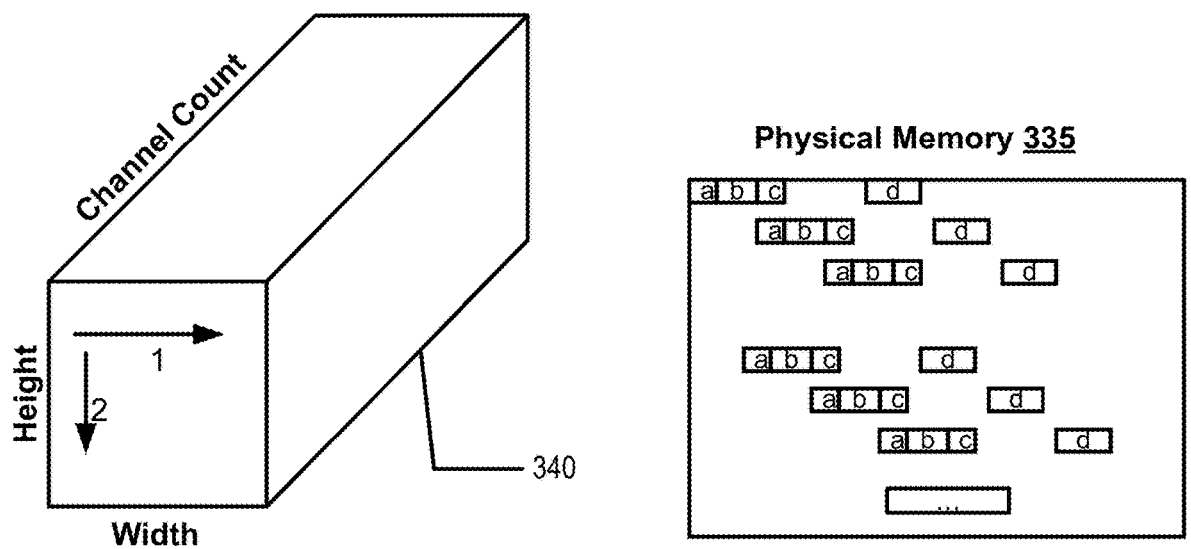
FIG. 3

REDUCING POWER CONSUMPTION IN A NEURAL NETWORK ENVIRONMENT USING DATA MANAGEMENT

RELATED APPLICATION

This application claims the benefit and priority of U.S. patent application Ser. No. 15/847,785 filed Dec. 19, 2017 and entitled REDUCING POWER CONSUMPTION IN A NEURAL NETWORK ENVIRONMENT USING DATA MANAGEMENT", the entire contents of which are incorporated herein by reference.

BACKGROUND

In artificial neural networks (NN) and deep neural networks (DNN), a neuron is the base unit used to model a biological neuron in the brain. The model of an artificial neuron includes a non-linearity applied to a product of an input vector and a weight vector added to a bias.

In processing data across an NN or a DNN, a controller performing exemplary processing operations is required to iterate over large amounts of data in order to apply specific operations. Such requirements can impact overall NN or DNN performance resulting in crucial latency to the detriment of a desired stated processing goal (e.g., identifying an object and/or object characteristic in exemplary input data— image, sound, geographic coordinates, etc.). Moreover, such requirements often increase the power consumption of a typical NN or DNN. For example, some existing NNs and DNNs expend avoidable processing time (e.g., floating/fixed point operations per second (GFlops/s)) and memory space (e.g., number of bytes transferred per second (GBytes/s)) in performing various operations inclusive of memory reads and writes to various cooperating memory components of the NN/DNN (e.g., one or more buffers or line buffers). Specifically, current practices do not identify critical features of input/data and/or provide instructions to the cooperating components of the NN or DNN regarding how best to manage/direct the read/write operations for the input data in the cooperating NN or DNN memory components inclusive of the data buffer to avoid such performance and power consumption issues. Inefficient processing of data amongst the neural processing components of the NN or DNN may degrade performance of the NN or DNN. Specifically, such inefficient data management and processing requires additional, often avoidable, computations/neural processor operations stressing overall NN/DNN performance and therefore increasing the power consumption associated with the NN or DNN.

A more advantageous NN/DNN would deploy instructions that direct the cooperating memory components of the NN/DNN, and specifically, the buffers of the NN/DNN, to reduce the number of reads and writes to the cooperating memory components during a data processing cycle. Specifically, reducing the number of bit flips associated with buffers and/or memory components in the NN/DNN may reduce the amount of power consumed by the NN and/or DNN.

It is with respect to these considerations and others that the disclosure made herein is presented.

SUMMARY

Techniques described herein provide for improved (i.e., reduced) power consumption in an exemplary neural network (NN) and/or Deep Neural Network (DNN) environment. The abbreviation "DNN" may be used alone in the following disclosure. However, it is to be understood that the described implementations are not limited to DNNs or NNs. That is, the described implementations may be used in other computing networks and general computing environments to achieve improved power consumption.

In some implementations, the improved power consumption in an exemplary DNN may be achieved by reducing a number of bit flips needed to process operands associated with one or more storages. In some implementations, such operands may be stored in one or more buffers. Reducing the number bit flips associated with a DNN may be achieved by multiplying an operand associated with a first storage with a plurality of individual operands associated with a second storage. In some implementations, the first storage and the second storage are buffers. Some of the buffers may be line buffers associated with the DNN. Furthermore, in some implementations, the operand associated with the first storage is neuron input data and the plurality of individual operands associated with the second storage are weight values for multiplication with the neuron input data. Additionally, in some implementations, the weight values for multiplication with the neuron input data may be associated with one or more kernels of the DNN.

In some implementations, enhanced management of values associated with kernels of a DNN may achieve improved power consumption in the DNN. For example, in some implementations, the number of bit flips associated with the DNN may be reduced by examining the values associated with a plurality of kernels of the DNN. This examination of the values associated with the plurality of kernels of the DNN may reveal that a plurality of values associated with at least a plurality of the kernels are commonly located across at least the plurality of kernels. The techniques described herein may arrange such kernels having commonly located values in an order to provide for sequential processing of the kernels having commonly located values.

Additionally, in some implementations, a training process, such as a training process integral to a DNN, may include techniques that arrange values (e.g., weights) associated with a plurality of kernels such that consecutive kernels of the plurality of kernels have one or more commonly located values. Such an implemented training process provides for the optimum arrangement and subsequent processing of kernels in the DNN, and decreases bit flipping in the DNN in order to reduce power consumption by the DNN. As can be appreciated by one of ordinary skill in the art, some electronic circuits consume power when changing the value of stored data. Instance, when an eight-bit register has a value of zero, and then it is assigned to a value of 255, e.g., 11111111, this transition requires eight bit flips and thus requires more power consumption than maintaining the number at zero or even converting it to another number with fewer bit flips, e.g. converting a value of zero to a value of one, e.g., 00000001.

Furthermore, in some implementations, the described techniques to improve or reduce power consumption in an exemplary DNN include generating an interleaved set of values from at least a plurality of kernels associated with the DNN. The values of the interleaved set of values may be multiplied with one or more input data values of the DNN in order to decrease bit flipping in the DNN and thereby reduce the power consumption associated with the DNN.

Additionally, in some implementations, the described techniques provide a system for data processing and management in a network environment. The system may include at least one processor, a first storage operable to store at least one input data value and to provide the at least one input data value to at least one processing unit. The system may further include a second storage to store first and second weight values, at least one memory in communication with the at least one processor, the at least one memory having computer-readable instructions stored thereupon that, when executed by the at least one processor, cause the at least one processor to perform at least a plurality of processing acts. For example, one or more of those acts may include retrieving the first weight value associated with a first kernel of the network environment, and retrieving the second weight value associated with a second kernel of the network environment. Furthermore, the instructions may cause the processor to store the first and second weight values in the second storage, and perform an operation on the at least one input data value provided to the at least one processing unit, the operation including at least multiplying the first weight value with the at least one input data value to provide a first weighted data value and multiplying the second weight value with the at least one input data value to provide a second weighted data value. In addition, the instructions may cause the processor to store the first and second weighted data values.

Moreover, in some implementations, the described techniques provide a computer-implemented method that includes: retrieving a first weight value associated with a first kernel of a network environment; retrieving a second weight value associated with a second kernel of the network environment; storing the first and second weight values; performing an operation on at least one input data value held in at least one processing unit, the operation including at least multiplying the first weight value with the at least one input data value to provide a first weighted data value and multiplying the second weight value with the at least one input data value to provide a second weighted data value; and storing the first and second weighted data values for further processing by the network environment.

Furthermore, in some implementations, the described techniques provide a computer-readable storage medium having computer-executable instructions stored thereupon which, when executed by one or more processors of a computing device, cause the one or more processors of the computing device to: retrieve a first weight value associated with a first kernel stored in a kernel storage associated with a neural network environment; retrieve a second weight value associated with a second kernel stored in the kernel storage associated with the network environment, the second kernel stored in the kernel storage immediately preceding or following the first kernel stored in the kernel storage associated with the neural network environment; store the first and second weight values in a staging buffer associated with the neural network environment; perform an operation on at least one input data value held in a neuron of the neural network environment, the operation including at least multiplying the first weight value with the at least one input data value to provide a first weighted data value and multiplying the second weight value with the at least one input data value to provide a second weighted data value; and store the first and second weighted data values in a storage associated with the neural network environment.

It should be appreciated that, although described in relation to a system, the above-described subject matter may also be implemented as a computer-controlled apparatus, a computer process, a computing system, or as an article of manufacture such as a computer-readable medium and/or dedicated chipset. Among many other benefits, the techniques herein improve efficiencies with respect to a wide range of computing resources. For instance, operations can be performed one two or more values, e.g., summing, multiplying or otherwise to perform a number of complex tasks, such as facial recognition, object recognition, image generation, classification detection, etc.

These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3 illustrates a block diagram of exemplary input data represented in an illustrative logical data mapping according to the herein described systems and methods.

Figure 4:
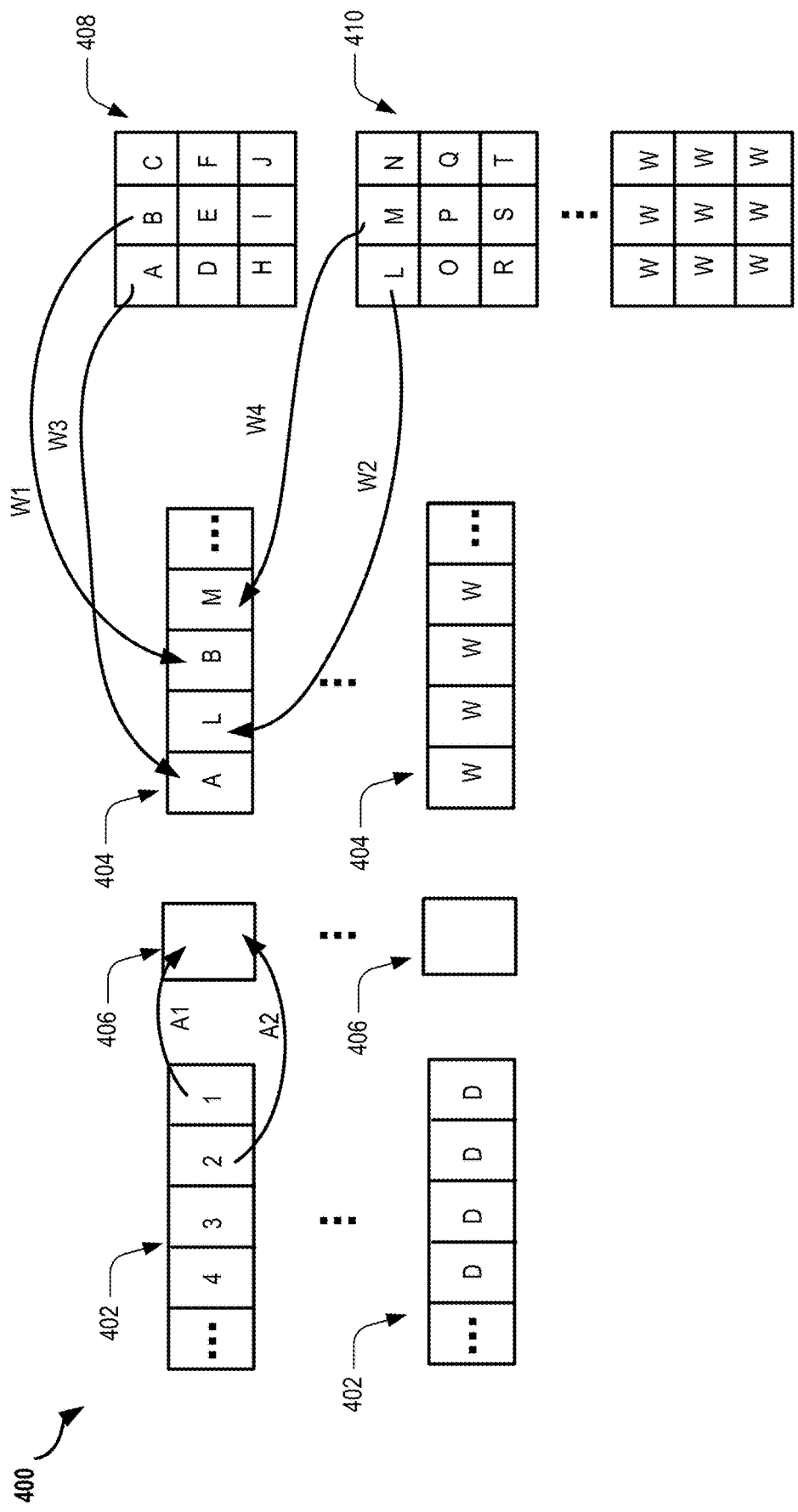

FIG. 4 illustrates exemplary buffers, neurons and kernels that may be associated with an exemplary neural network environment. The illustrated exemplary buffers, neurons and kernels may be associated with the environments illustrated in FIGS. 1-2. In some implementations, the buffers include line buffers and staging buffers.

Figure 5:
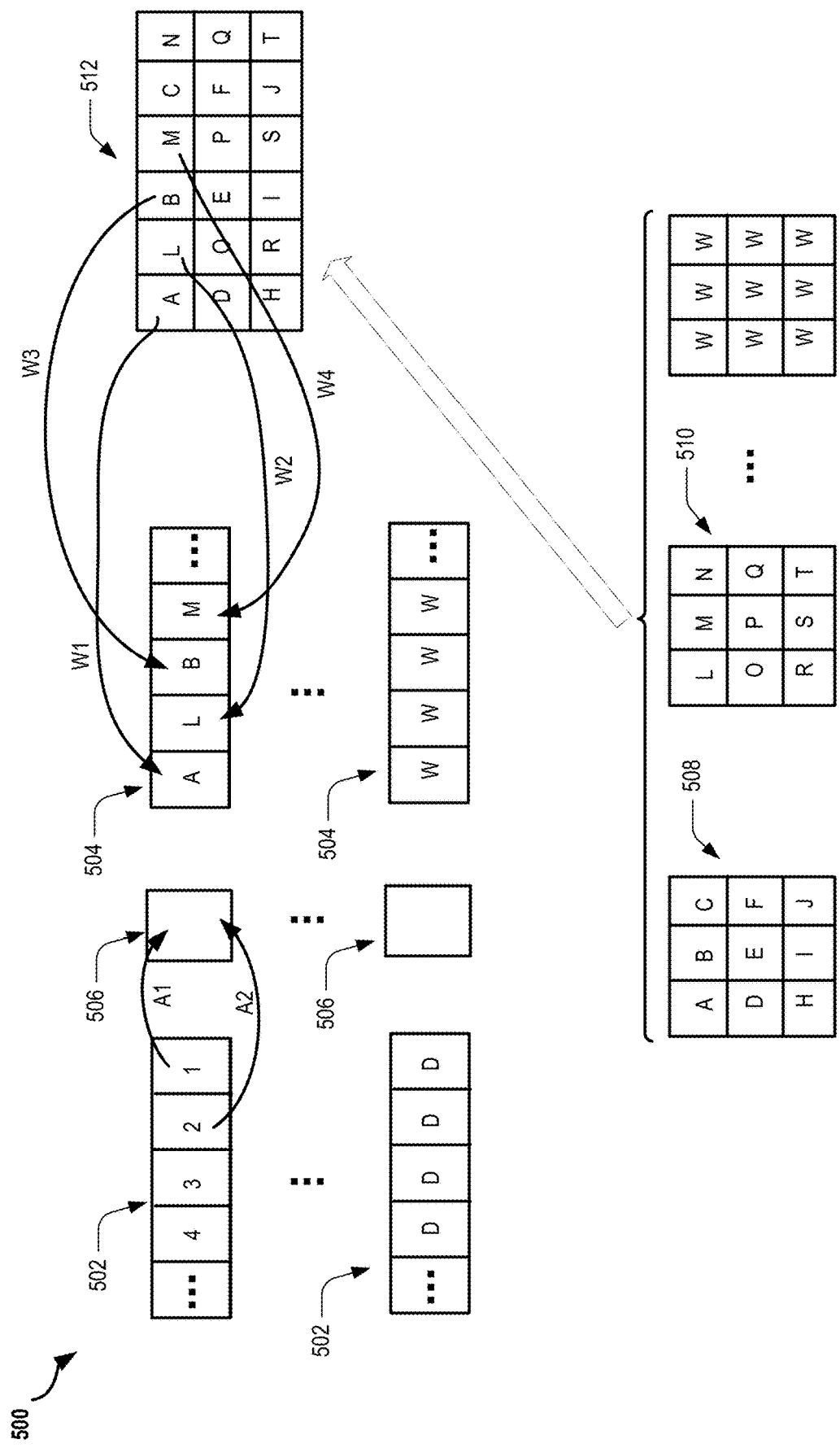

FIG. 5 illustrates exemplary buffers, neurons, kernels and a set of interleaved weight values that may be associated with an exemplary neural network environment. The illustrated exemplary buffers, neurons, kernels and a set of interleaved weight values may be associated with the environments illustrated in FIGS. 1-2. In some implementations, the buffers include line buffers and staging buffers.

FIG. 6A illustrates exemplary kernels that may be processed by the disclosed exemplary neural network environments. In some implementations, the exemplary kernels may contain weights that are combined with data associated with buffers and/or neurons.

FIG. 6B illustrates exemplary kernels that may be processed by the disclosed exemplary neural network environments. In some implementations, the exemplary kernels may contain weights that are combined with data associated with buffers and/or neurons.

Figure 7:
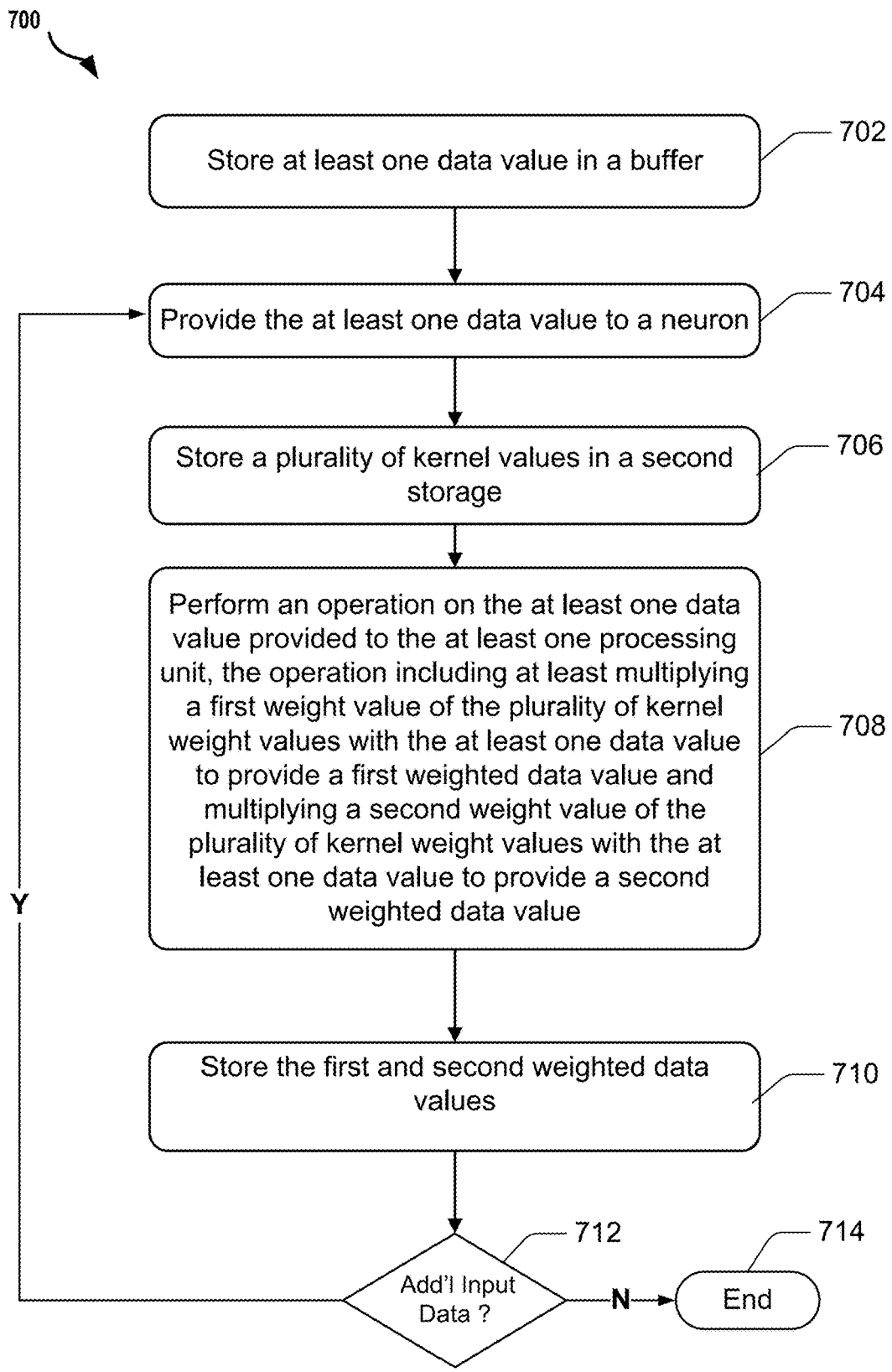

FIG. 7 is a flow diagram of an illustrative process for the processing of data in an exemplary neural network environment. The illustrative process for processing data may reduce bit flipping in the exemplary neural network environment. The reduction of bit flipping is a data management technique that may reduce power consumption by the exemplary neural network environment.

Figure 8:
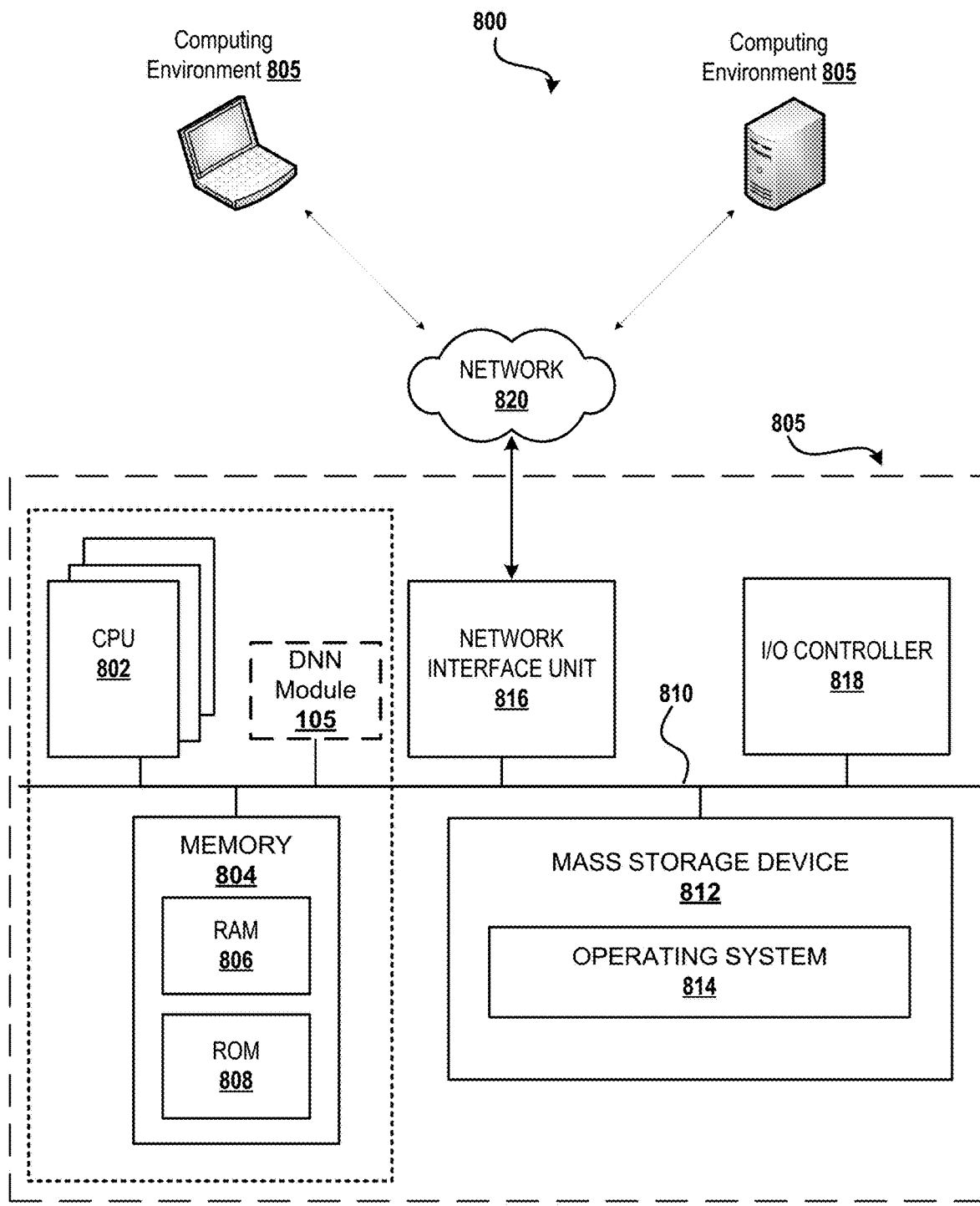

FIG. 8 shows additional details of an illustrative computer architecture for a computer capable of executing the herein described methods.

Figure 9:
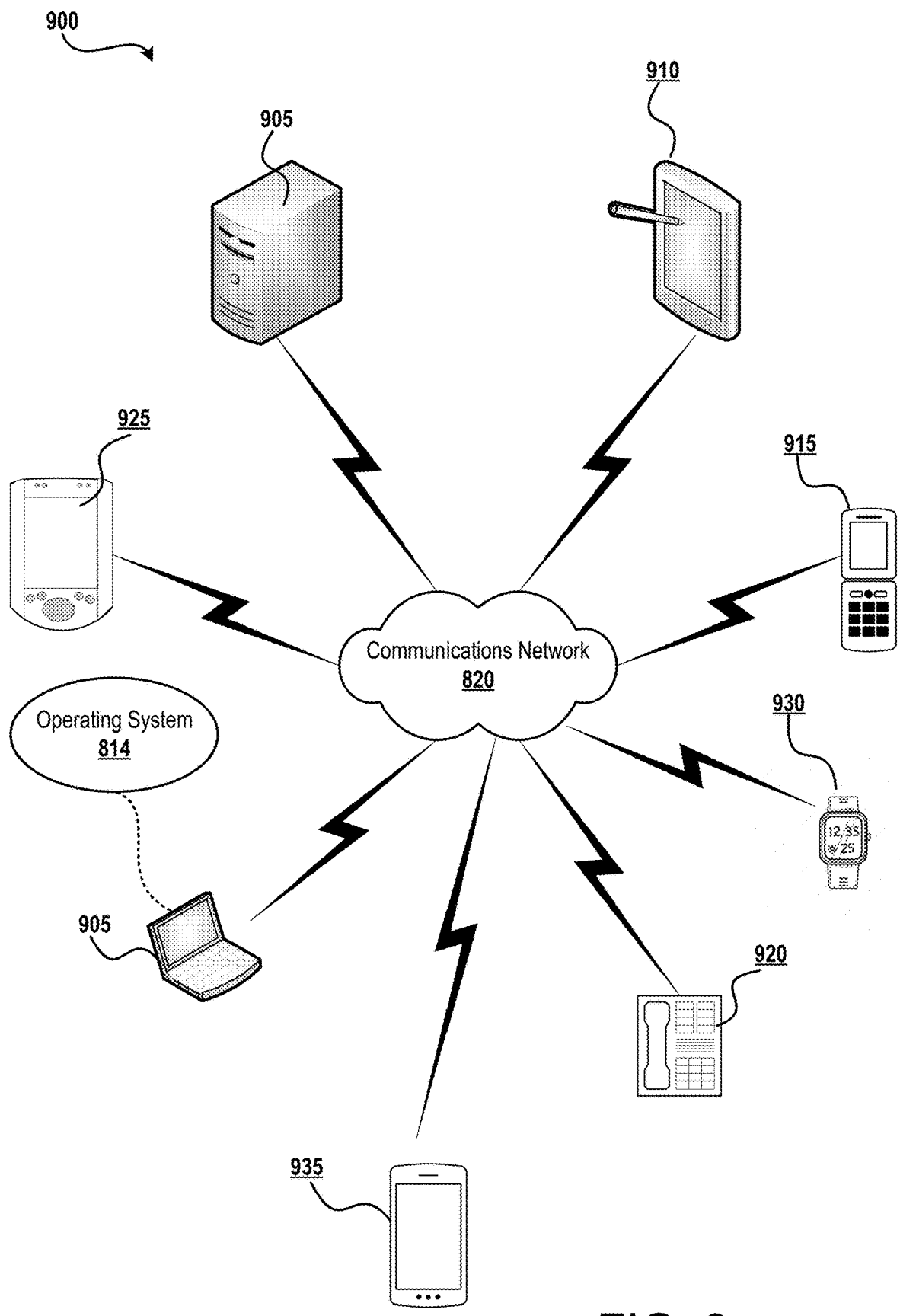

FIG. 9 shows additional details of illustrative computing devices operating in accordance with the herein described systems and methods.

DETAILED DESCRIPTION

The following Detailed Description describes techniques to provide for improved (i.e., reduced) power consumption in an exemplary neural network (NN) and/or Deep Neural Network (DNN) environment. The abbreviation "DNN" may be used alone in the following disclosure. However, it is to be understood that the described implementations are not limited to DNNs or NNs. That is, the described implementations may be used in other computing networks to achieve improved power consumption.

In some implementations, the improved power consumption in an exemplary DNN may be achieved by reducing a number of bit flips needed to process operands associated with one or more storages. In some implementations, such operands may be stored in one or more buffers. Reducing the number bit flips associated with a DNN may be achieved by multiplying an operand associated with a first storage with a plurality of individual operands associated with a second storage. In some implementations, the first storage and the second storage are buffers. Some of the buffers may be line buffers associated with the DNN. Furthermore, in some implementations, the operand associated with the first storage is neuron input data and the plurality of individual operands associated with the second storage are weight values for multiplication with the neuron input data. Additionally, in some implementations, the weight values for multiplication with the neuron input data may be associated with one or more kernels of the DNN.

In some implementations, enhanced management of values associated with kernels of a DNN may achieve improved power consumption in the DNN. For example, in some implementations, the number of bit flips associated with the DNN may be reduced by examining the values associated with a plurality of kernels of the DNN. This examination of the values associated with the plurality of kernels of the DNN may reveal that a plurality of values associated with at least a plurality of the kernels are commonly located across at least the plurality of kernels. The techniques described herein may arrange such kernels having commonly located values in an order to provide for sequential processing of the kernels having commonly located values.

Additionally, in some implementations, a training process, such as a training process integral to a DNN, may include techniques that arrange values (e.g., weights) associated with a plurality of kernels such that consecutive kernels of the plurality of kernels have one or more commonly located values. Such an implemented training process provides for the optimum arrangement and subsequent processing of kernels in the DNN, and decreases bit flipping in the DNN in order to reduce power consumption by the DNN.

Furthermore, in some implementations, the described techniques to improve or reduce power consumption in an exemplary DNN include generating an interleaved set of values from at least a plurality of kernels associated with the DNN. The values of the interleaved set of values may be multiplied with one or more input data values of the DNN in order to decrease bit flipping in the DNN and thereby reduce the power consumption associated with the DNN. The kernels associated with the DNN may be stored in a storage of the DNN in a manner that reduces or minimizes bit flipping in the DNN. Therefore, in some implementations, the interleaved set of values may be generated from intentionally consecutively stored kernels associated with the DNN.

Additionally, in some implementations, the described techniques provide a system for data processing and management in a network environment. The system may include at least one processor, a first storage operable to store at least one input data value and to provide the at least one input data value to at least one processing unit. The system may further include a second storage to store first and second weight values, at least one memory in communication with the at least one processor, the at least one memory having computer-readable instructions stored thereupon that, when executed by the at least one processor, cause the at least one processor to perform at least a plurality of processing acts. For example, one or more of those acts may include retrieving the first weight value associated with a first kernel of the network environment, and retrieving the second weight value associated with a second kernel of the network environment. Furthermore, the instructions may cause the processor to store the first and second weight values in the second storage, and perform an operation on the at least one input data value provided to the at least one processing unit, the operation including at least multiplying the first weight value with the at least one input data value to provide a first weighted data value and multiplying the second weight value with the at least one input data value to provide a second weighted data value. In addition, the instructions may cause the processor to store the first and second weighted data values.

Moreover, in some implementations, the described techniques provide a computer-implemented method that includes: retrieving a first weight value associated with a first kernel of a network environment; retrieving a second weight value associated with a second kernel of the network environment; storing the first and second weight values; performing an operation on at least one input data value held in at least one processing unit, the operation including at least multiplying the first weight value with the at least one input data value to provide a first weighted data value and multiplying the second weight value with the at least one input data value to provide a second weighted data value; and storing the first and second weighted data values for further processing by the network environment.

Furthermore, in some implementations, the described techniques provide a computer-readable storage medium having computer-executable instructions stored thereupon which, when executed by one or more processors of a computing device, cause the one or more processors of the computing device to: retrieve a first weight value associated with a first kernel stored in a kernel storage associated with a neural network environment; retrieve a second weight value associated with a second kernel stored in the storage associated with the network environment, the second kernel stored in the kernel storage immediately preceding or following the first kernel stored in the kernel storage associated with the neural network environment; store the first and second weight values in a staging buffer associated with the neural network environment; perform an operation on at least one input data value held in a neuron of the neural network environment, the operation including at least multiplying the first weight value with the at least one input data value to provide a first weighted data value and multiplying the second weight value with the at least one input data value to provide a second weighted data value; and store the first and second weighted data values in a storage associated with the neural network environment.

In some implementations, an exemplary DNN environment can comprise one or more processing blocks (e.g., computer processing units—CPUs), a memory controller, one or more buffers (e.g., one or more line buffers and one or more staging buffers), a high bandwidth fabric (e.g., local or external fabric) (e.g., data bus passing data and/or data elements between an exemplary DNN module and the cooperating components of a DNN environment), operation controller, and a DNN module. In the illustrative implementation, the exemplary DNN module can comprise an exemplary DNN state controller, a descriptor list controller (DLC), direct memory access (DMA) engine, data direct memory access (DDMA) engine, DMA Streaming Activations (DSA), operation controller, load controller, and store controller. For the purpose of the herein described systems and methods, the inventive concepts can be implemented in NNs and/or DNNs. As indicated above, when reference is made to a DNN in this disclosure it shall also mean to be inclusive of and applicable to a NN and other applicable networks that include one or more buffers.

In an illustrative operation, the operational controller of the NN/DNN environment can operatively process large amounts of data in order to apply one or more desired data processing operations (e.g., convolution, max pooling, scalar multiply/add, summation, fully connected, etc.). In the illustrative operation, a participating user can specify the dimensions of the data being processed as well as the configuration on how to process through the data for use by the NN/DNN computing environment through the use of at least one buffer, for example, at least one line buffer.

Illustratively, one or more line buffers can be architected to store data in a predefined number of rows/lines (e.g., 64 rows, lines) that can receive a selected amount of data amongst the rows/lines (e.g., 32 bytes of data can be received for each line of the line buffer). The line buffers can operate to shift the input data using one or more calculated shifting bits based on the characteristics of the input data (e.g., stride value, continuity, height, width, kernel, etc.) (e.g., if stride has a value of 0 then the lines of a line buffer can have the same data, whereas if the stride has a value of 1, the data can be shifted by 1 to allow for more efficient read/write operation within the line buffer).

Generally, a line buffer can be used to provide input to one or more processing units of the NN/DNN (e.g., processing neurons) at a rate the occupies the neurons during each processing cycle. The inputs to the one or more processing units of the DNN may be multiplied with stored kernel values. Such stored kernel values may be allocated to a buffer (e.g., a staging buffer). The stored kernel values may be provided by one or more kernels of the DNN.

The line buffer can be expressed as a memory or storage in an exemplary architecture of a DNN chip or architecture. As such a memory, it can operate to load the data therein that one or more cooperating neurons (e.g., the processing units) can retrieve to perform desired processing. Illustratively, the one or more cooperating neurons can be connected to one or more rows in the line buffer. The line buffer can operatively, load data from a block of memory and write data from that block of memory to the one or more rows associated with the one or more neurons. Furthermore, the staging buffer can be expressed similarly as a memory or storage in an exemplary architecture of the DNN chip or architecture. As indicated, the staging buffer may include one or more rows of kernel values. The kernel values of the staging buffer may be multiplied with data contained in the cooperating neurons.

Neural Networks Background

In artificial neural networks, a neuron is the base unit used to model a biological neuron in the brain. The model of an artificial neuron can include the inner product of an input vector with a weight vector added to a bias, with a non-linearity applied. Comparatively, a neuron, in an exemplary DNN module, (e.g., 105 of FIG. 1) is closely mapped to an artificial neuron.

Illustratively, the DNN module can be considered a superscalar processor. Operatively, it can dispatch one or more instructions to multiple execution units called neurons. The execution units can be "simultaneous dispatch simultaneous complete" where each execution unit is synchronized with all of the others. A DNN module can be classified as a SIMD (single instruction stream, multiple data stream) architecture.

Figure 1:
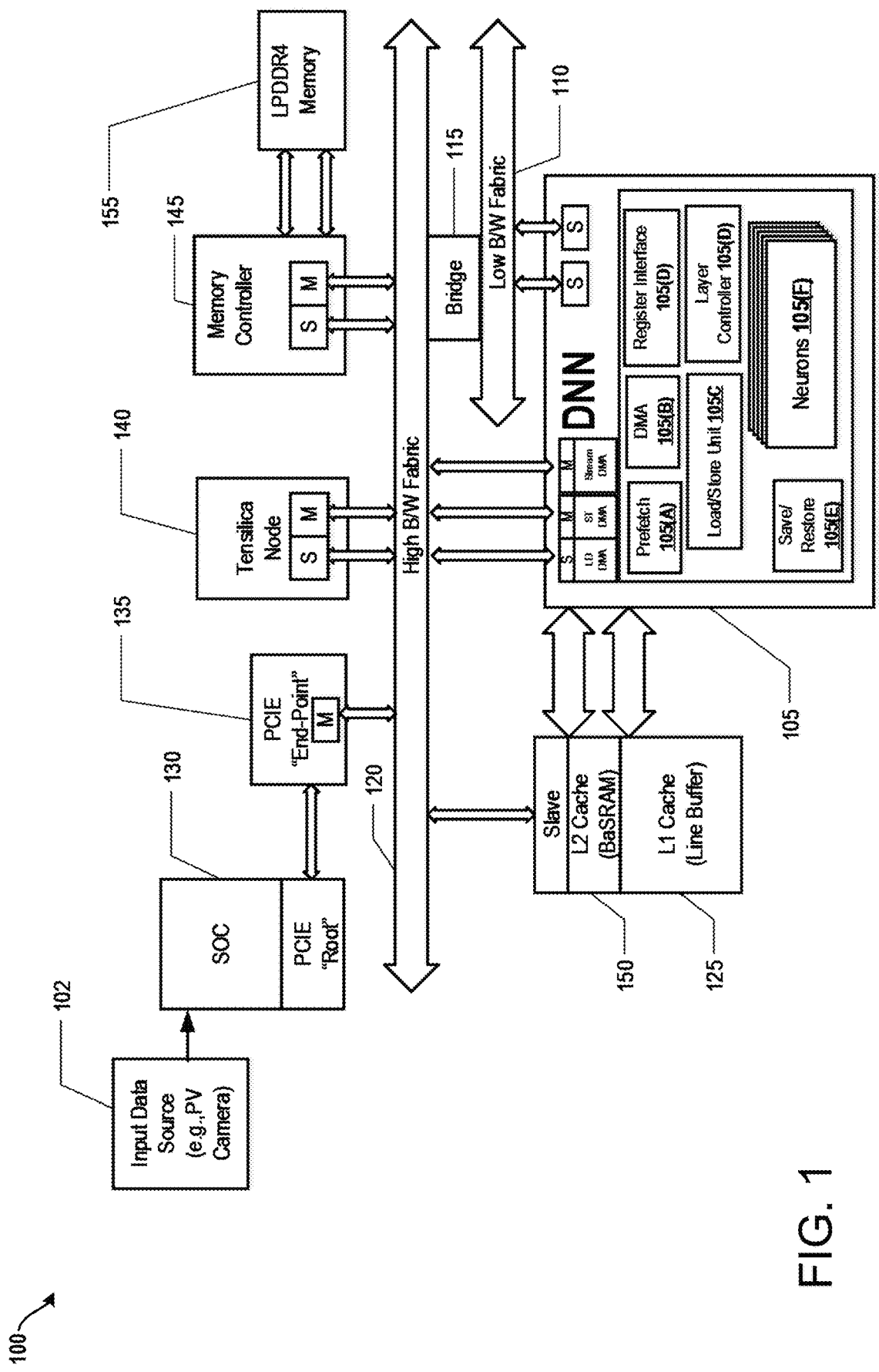
FIG. 1 illustrates a block diagram of an exemplary neural network computing environment in accordance with the herein described systems and methods.

Turning to exemplary DNN environment 100 of FIG. 1, DNN module 105 has a memory subsystem with a unique L1 and L2 caching structure. These are not traditional caches, but are designed specifically for neural processing. For convenience, these caching structures have adopted names that reflect their intended purpose. By way of example, the L2 cache 150 can illustratively maintain a selected storage capacity (e.g., one megabyte (1 MB)) with a high speed private interface operating at a selected frequency (e.g., sixteen giga-bits per second (16 GBps)). The L1 cache 125 can maintain a selected storage capacity (e.g., eight kilobytes (8 KB)) that can be split between kernel and activation data. The L1 cache can be referred to as buffer (e.g., a line buffer), and the L2 cache can be referred to as BaSRAM.

The DNN module can be a recall-only neural network and programmatically support a wide variety of network structures. Training for the network can be performed offline in a server farm or data center; the DNN module does not perform any training functions in some implementations. However, in other implementations, the DNN module may perform training functions. The result of training is a set of parameters that can be known as either weights or kernels. These parameters represent a transform function that can be applied to an input with the result being a classification(s) and/or regressed value(s).

In an illustrative operation, the DNN module can accept planar data as input. Input is not limited to image data only, as long as the data presented is in a uniform format (e.g., data in a planar format), the DNN can operate on it.

The DNN module operates on a list of layer descriptors which correspond to the layers of a neural network. Illustratively, the list of layer descriptors can be treated by the DNN module as instructions. These descriptors can be pre-fetched from memory into the DNN module and executed in order.

Generally, there can be two main classes of layer descriptors: 1) memory-to-memory move descriptors, and 2) operation descriptors. Memory-to-memory move descriptors can be used to move data to/from the main memory to/from a local cache for consumption by the operation descriptors. Memory-to-memory move descriptors follow a different execution pipeline than the operation descriptors. The target pipeline for memory-to-memory move descriptors can be the internal Direct Memory Access (DMA) engine, whereas the target pipeline for the operation descriptors can be the neuron processing elements. Operation descriptors are capable of many different layer operations.

The output of the DNN is data. The output can optionally be streamed to a local cache or streamed to main memory. The DNN module can pre-fetch data as far ahead as the software will allow. Software can control pre-fetching by using fencing and setting dependencies between descriptors. Descriptors that have dependencies sets are prevented from making forward progress until the dependencies have been satisfied.

Turning now to FIG. 1, an exemplary neural network environment 100 can comprise various cooperating components inclusive of DNN module 105, cache memory 125 or 150, low bandwidth fabric 110, bridge component 115, high bandwidth fabric 120, SOC 130, PCIE "End Point" 135, Tensilica Node 140, memory controller 145, LPDDR4 memory 155, and an input data source 102. Further, as is shown, DNN module 105 can also comprise a number of components comprising prefetch 105(A), DMA 105(B), Register Interface 105(D), load/store unit 105(C), layer controller 105(D), save/restore component 105(E), and neurons 105(F). Operatively, an exemplary DNN environment 100 can process data according to a selected specification wherein the DNN module performs one or more functions as described herein.

Figure 2:
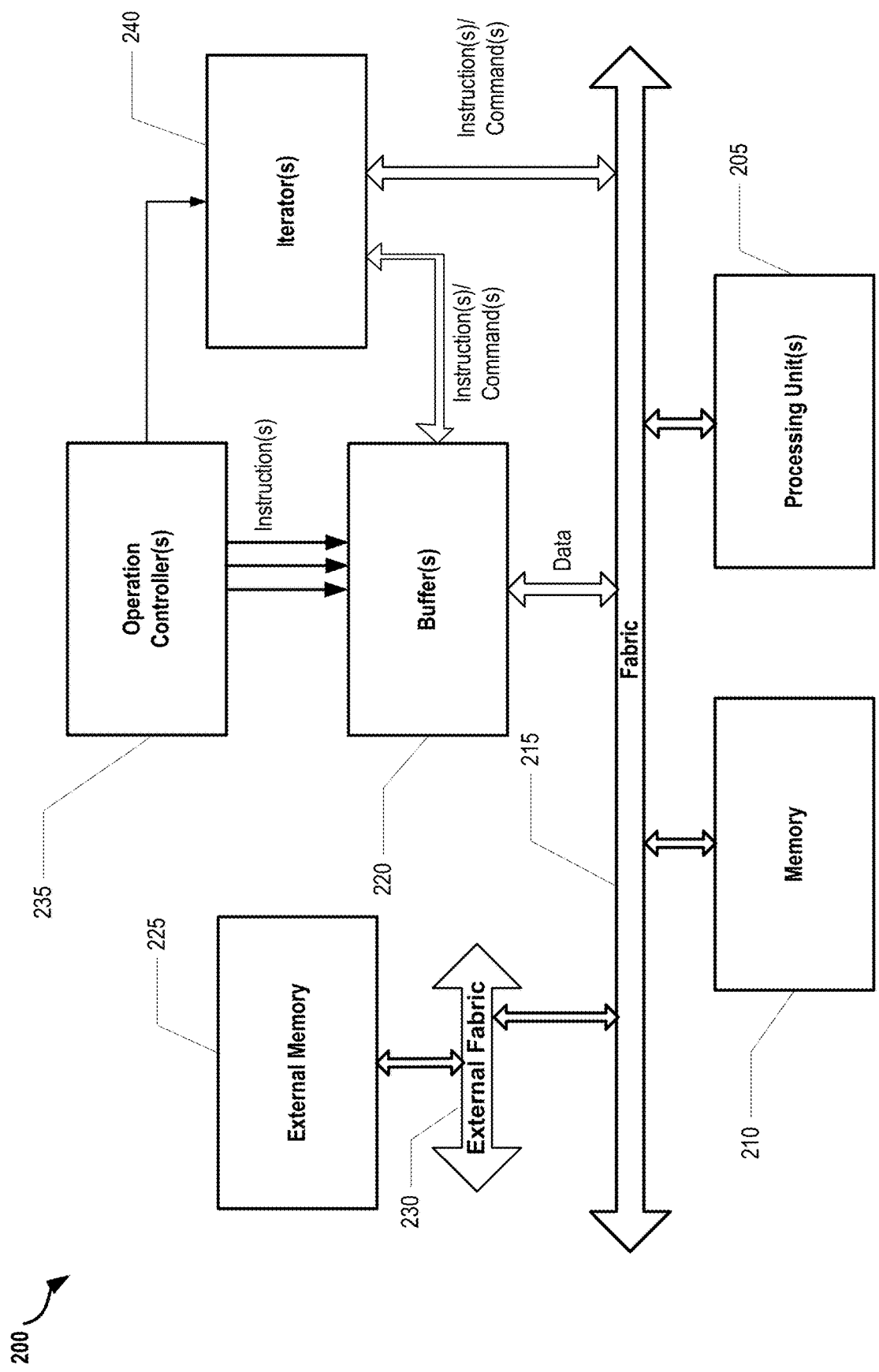
FIG. 2 illustrates a block diagram of an exemplary neural network environment utilizing buffers and processing units. In some implementations, the buffers comprise line buffers and staging buffers, and the processing units comprise neurons of the exemplary neural network computing environment.

FIG. 2 illustrates an exemplary neural network environment 200 that includes one or more buffers 220 as part of data processing in the environment 200. The buffers 220 may include directed line buffers comprising data processed by processing units 205 (e.g., neurons), as well as staging buffers comprising weight values for multiplication with the data processed by the processing units 205. As is shown, the exemplary neural network environment 200 (also referred to herein as a computing device or a computing device environment) comprises one or more operation controllers 235 that cooperate with the line and staging buffers (i.e., buffers 220) to provide one or more instructions for data processing. The line buffers can operate to receive data from cooperating external memory components 225 and/or memory 210 through external fabric 230 and fabric 215, and can also operate to receive one or more instructions/commands from iterator(s) 240. The instructions/commands from the iterator 240 can include a command or instruction to read data from a cooperating external memory component 225 and/or memory 210 and/or an instruction to write data loaded from the cooperating external memory component 225 and/or memory 210 in the line buffer. Operatively, the line buffer can insert a calculated one or more shifting bit(s) into the data and write the bit shifted data in the line buffer according to one or more instructions received from one or more operations controller(s) 235 (also referred to herein as a "cooperating controller component 235"). Furthermore, the line buffer can cooperate with the processing unit(s) 205 (e.g., neuron(s)) to provide the written bit shifted data for further processing. Such further processing may include multiplying weights associated with one or more staging buffers with data stored in the processing units 205. A neural network environment fabric can be a data bus capable of passing through various data. A directed line buffer can be considered as a memory component capable of reading and writing data and/or data elements according to one or more received instructions.

FIG. 3 illustrates an example logical data mapping 300 for exemplary input data 305. The data 305 can be represented as data having a certain dimension 340 (e.g., such that data dimensions taken as a whole can define a data volume) comprising channel count 310, height 315, and width 320.

According to the herein described systems and methods, the data 305 can be portioned and prepared for processing by cooperating n neurons 330 such that a first portion a can be communicated to a first neuron, a second portion b can be communicated to a second neuron, and so forth until n portions are communicated to n neurons.

In an illustrative operation, the portions of data 305 can be determined using n sliding window/kernels 325 based on one or more instructions provided by a cooperating controller component 235 of an exemplary neural network environment (e.g., 200 of FIG. 2). Further as is shown, the input data portions a, b, c, and d can be addressed to a physical memory 335 using one or more initialization parameters provided by a cooperating operation controller component 235 of an exemplary neural network environment (e.g., 200 of FIG. 2).

FIG. 4 illustrates exemplary buffers 402-404, neurons 406 and kernels 408-410 that may be associated with an exemplary neural network environment 400. The illustrated exemplary buffers 402-404, neurons 406 and kernels 408-410 may be associated with the environments illustrated in FIGS. 1-2. In some implementations, the buffers 402-404 include line buffers (402) and staging buffers (404). As illustrated, the exemplary neural network environment 400 may include a plurality of each of the exemplary buffers 402 and 404, a plurality of neurons 406 and a plurality of kernels 408-410. Specifically, the exemplary neural network environment 400 may comprise any number of buffers, neurons, and/or kernels. In some implementations, the neurons 406 may be referred to as processing units. The kernels 408-410 are illustrated two dimensionally. However, it is to be understood that the kernels 408-410 may be multidimensional data structures, such as those illustrated in FIG. 3.

The buffer 402 may include one or more input data values 1-4 for processing by the exemplary neural network environment 400. In some implementations, as indicated, the buffer 402 is a line buffer of the exemplary neural network environment 400. The buffer 404 may include one or more weight values A, L, B and M. The one or more weight values A, L, B and M may be allocated to the buffer 404 from one or more of the kernels 408 and 410. In some implementations, the one or more weight values A, L, B and M are to be multiplied with one or more of the input data values 1-4 associated with the buffer 402.

Exemplary operations and functions associated with the exemplary neural network environment 400 are discussed following herein. Data from the buffer 402 may be loaded or provided to the neuron 406, as shown by arrow A1. Additionally, weights from the kernels 408 and 410 may be loaded or provided to the buffer 404, as is shown by arrows W1-W4.

The input data value 1 is provided to the neuron 406, as shown by arrow A1, and the input data value 1 is held in the neuron 406. An operation is then performed to multiply the weight A with the input data value 1 held in the neuron 406. However, an operation other than multiplying may also be used. For example, the operation may include adding, subtracting, dividing, combining, maxing, the use of any binary operation, the use of an activation function, or other function, etc. The product of the multiplication may be stored in a storage (e.g., memory), such as an accumulator, associated with the neural network environment 400. Next, an operation is performed to multiply the weight L with the input data value 1 held in the neuron 406. The product of the multiplication may be stored in a storage (e.g., memory), such as an accumulator, associated with the neural network environment 400. As is illustrated, the input data value 1 is held in the neuron 406 as weights (e.g. weights A and L) in spatially equivalent holding positions of the kernels 408 and 410, which are multiplied with the input data value 1. The process of holding the input data value 1 in the neuron 406, while multiplying weights in spatially equivalent holding positions of kernels, reduces bit flipping in the exemplary neural network environment 400. Specifically, holding the input data value 1 in the neuron 406 while performing multiplications of weight values reduces bit flipping associated with data held in the buffer 402. The reduction of bit flipping is a data management technique that reduces the amount of power consumed by the exemplary neural network environment 400.

Once the weight multiplications associated with the input data value 1 are complete, the input data value 2 is provided to the neuron 406, as shown by arrow A2, and the input data value 2 is held in the neuron 406. An operation is then performed to multiply the weight B with the input data value 2 held in the neuron 406. The product of the multiplication may be stored in a storage (e.g., memory), such as an accumulator, associated with the neural network environment 400. Next, an operation is performed to multiply the weight M with the input data value 2 held in the neuron 406. The product of the multiplication may be stored in a storage (e.g., memory), such as an accumulator, associated with the neural network environment 400. As is illustrated, the input data value 2 is held in the neuron 406 as weights (e.g. weights B and M) in spatially equivalent holding positions of the kernels 408 and 410, which are multiplied with the input data value 2. The process of holding the input data value 2 in the neuron 406, while multiplying weights in spatially equivalent holding positions of kernels, reduces bit flipping in the exemplary neural network environment 400. Specifically, holding the input data value 2 in the neuron 406 while performing multiplications of weight values reduces bit flipping associated with data held in the buffer 402. The reduction of bit flipping is a data management technique that reduces the amount of power consumed by the exemplary neural network environment 400.

The operations described in the foregoing may be repeated for any number of input data values and weight values associated with buffers and kernels. Furthermore, as illustrated, in some implementations the weights provided to the buffer 404 are from consecutively stored kernels 408-410. The kernels 408-410 may be consecutively stored in the exemplary neural network environment 400 based on the weights included in the respective kernels 408 and 410. For example, it may be beneficial in further reducing bit flipping in the exemplary neural network environment 400 to consecutively store kernels that have weight values that are equal and equivalently spatially held in respective ones of the kernels. In some implementations, a training process associated with the exemplary neural network environment 400 may generate kernels that have one or more weight values that are equal and equivalently spatially held compared to other kernels generated by the training process.

FIG. 5 illustrates exemplary buffers 502-504, neurons 506 and kernels 508-510 that may be associated with an exemplary neural network environment 500. The illustrated exemplary buffers 502-504, neurons 506 and kernels 508-510 may be associated with the environments illustrated in FIGS. 1-2. In some implementations, the buffers 502-504 include line buffers (502) and staging buffers (504). As illustrated, the exemplary neural network environment 500 may include a plurality of each of the exemplary buffers 502 and 504, a plurality of neurons 506 and a plurality of kernels 508-510. Specifically, the exemplary neural network environment 500 may comprise any number of buffers, neurons, and/or kernels. In some implementations, the neurons 506 may be referred to as processing units. The kernels 508-510 are illustrated two dimensionally. However, it is to be understood that the kernels 508-510 may be multidimensional data structures, such as those illustrated in FIG. 3.

The implementation illustrated in FIG. 5 further includes a set of interleaved weight values 512. The set of interleaved weight values 512 may be stored in a storage (e.g., memory) associated with the neural network environment 500. The set of interleaved weight values 512 includes weights extracted from the kernels 508-510. The weights from the kernels 508-510 are interleaved in a manner to provide for the processing described in the following description.

The buffer 502 may include one or more input data values 1-4 for processing by the exemplary neural network environment 500. In some implementations, as indicated, the buffer 502 is a line buffer of the exemplary neural network environment 500. The buffer 504 may include one or more weight values A, L, B and M. The one or more weight values A, L, B and M may be allocated to the buffer 504 from the set of interleaved weight values 512. In some implementations, the one or more weight values A, L, B and M are to be multiplied with one or more of the input data values 1-4 associated with the buffer 502.

Exemplary operations and functions associated with the exemplary neural network environment 500 are discussed in the following. Data from the buffer 502 may be loaded or provided to the neuron 506, as shown by arrow A1. Additionally, weights from the set of interleaved weight values 512 may be loaded or provided to the buffer 504, as is shown by arrows W1-W4.

The input data value 1 is provided to the neuron 506, as shown by arrow A1, and the input data value 1 is held in the neuron 506. An operation is then performed to multiply the weight A with the input data value 1 held in the neuron 506. However, an operation other than multiplying may also be used. For example, the operation may include adding, subtracting, dividing, combining, etc. The product of the multiplication may be stored in a storage (e.g., memory), such as an accumulator, associated with the neural network environment 500. Next, an operation is performed to multiply the weight L with the input data value 1 held in the neuron 506. The product of the multiplication may be stored in a storage (e.g., memory), such as an accumulator, associated with the neural network environment 500. As is illustrated, the input data value 1 is held in the neuron 506 as weights (e.g. weights A and L) in spatially equivalent holding positions of the kernels 508 and 510, which are multiplied with the input data value 1. The process of holding the input data value 1 in the neuron 506, while multiplying weights in spatially equivalent holding positions of kernels, reduces bit flipping in the exemplary neural network environment 500. Specifically, holding the input data value 1 in the neuron 506 while performing multiplications of weight values reduces bit flipping associated with data held in the buffer 502. The reduction of bit flipping is a data management technique that reduces the amount of power consumed by the exemplary neural network environment 400.

Once the weight multiplications associated with the input data value 1 are complete, the input data value 2 is provided to the neuron 506, as shown by arrow A2, and the input data value 2 is held in the neuron 506. An operation is then performed to multiply the weight B with the input data value 2 held in the neuron 506. The product of the multiplication may be stored in a storage (e.g., memory), such as an accumulator, associated with the neural network environment 500. Next, an operation is performed to multiply the weight M with the input data value 2 held in the neuron 506. The product of the multiplication may be stored in a storage (e.g., memory), such as an accumulator, associated with the neural network environment 500. As is illustrated, the input data value 2 is held in the neuron 506 as weights (e.g. weights B and M) in spatially equivalent holding positions of the kernels 508 and 510, which are multiplied with the input data value 2. The process of holding the input data value 2 in the neuron 506, while multiplying weights in spatially equivalent holding positions of kernels, reduces bit flipping in the exemplary neural network environment 500. Specifically, holding the input data value 2 in the neuron 506 while performing multiplications of weight values reduces bit flipping associated with data held in the buffer 502. The reduction of bit flipping is a data management technique that reduces the amount of power consumed by the exemplary neural network environment 500.

The operations described in the foregoing may be repeated for any number of input data values and weight values associated with buffers, kernels and the set of interleaved weight values 512. Furthermore, as illustrated, in some implementations the weights provided to the set of interleaved weight values 512 are from consecutively stored kernels 508-510. The kernels 508-510 may be consecutively stored in the exemplary neural network environment 500 based on the weights included in the respective kernels 508 and 510. For example, it may be beneficial in further reducing bit flipping in the exemplary neural network environment 500 by consecutively storing kernels that have weight values that are equal and equivalently spatially held in respective ones of the kernels. In some implementations, a training process associated with the exemplary neural network environment 500 may generate kernels that have one or more weight values that are equal and equivalently spatially held compared to other kernels generated by the training process.

Figure 6:
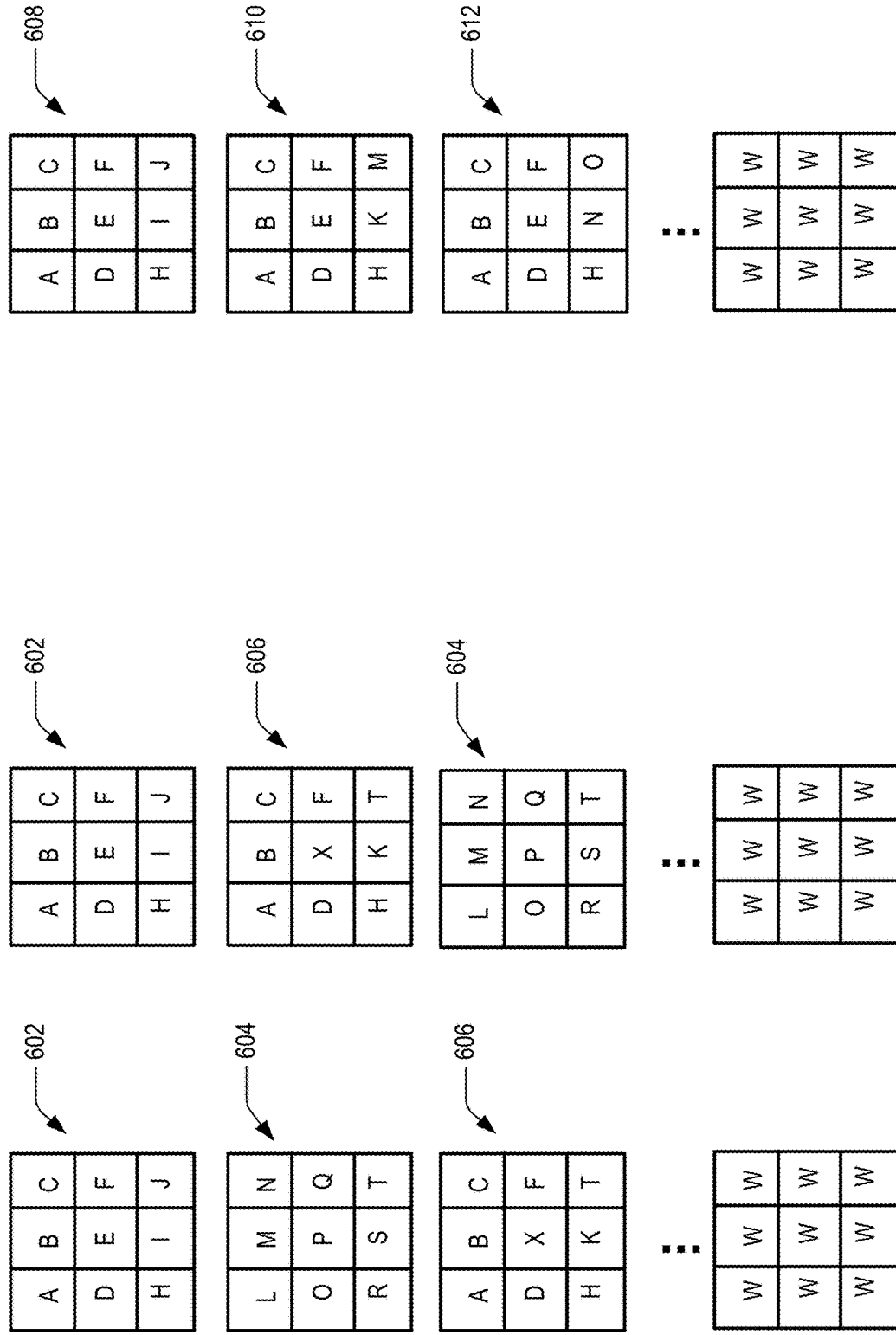

In an illustrative operation, the exemplary neural network environments 100, 200, 400 and/or 500 can operatively process data according to the process described in FIG. 6. However, the components of the exemplary neural network environments 100, 200, 400 and/or 500 are merely illustrative, as one of ordinary skill in the art would appreciate the process described in FIG. 6 may be performed by other components than those illustrated and described with respect to FIGS. 1-6B and 8-9.

FIGS. 6A and 6B illustrate exemplary kernels that may be processed by the exemplary neural network environments 100, 200, 400 and/or 500. In some implementations, the exemplary kernels may contain weights that are combined (e.g., multiplied, added, subtracted, etc.) with data associated with buffers and/or neurons (e.g., see FIGS. 4 and 5). In some implementations, the exemplary neural network environments 100, 200, 400 and/or 500 process the kernels in a manner that reduces or minimizes bit flipping in the exemplary neural network environments 100, 200, 400 and/or 500.

Referring to FIG. 6A, in some implementations, the exemplary neural network environments 100, 200, 400 and/or 500 may analyze weight values (e.g., A, B, etc.) associated with a plurality of kernels 602, 604 and 606. Specifically, the exemplary neural network environments 100, 200, 400 and/or 500 may analyze the plurality of kernels 602, 604 and 606 to determine if weights are allocated to the same weight value holding positions in respective kernels 602, 604 and/or 606. For example, the analysis may reveal that kernels 602 and 606 have at least a plurality weight values (i.e., A, B, C, D, F and H) that are held in the same respective weight value holding positions of the kernels 602 and 606. In some implementations, bit flipping may be reduced or minimized in the exemplary neural network environments 100, 200, 400 and/or 500 when the kernels 602 and 606 are processed consecutively. In some implementations, the kernel 602 and 606 may be rearranged, as illustrated, and then processed consecutively by the exemplary neural network environments 100, 200, 400 and/or 500. Alternatively, in some implementations, the exemplary neural network environments 100, 200, 400 and/or 500 may process the kernels 602 and 606 consecutively (i.e., before processing the kernel 604), without rearranging the kernels 602-606, to reduce or minimize bit flipping in the exemplary neural network environments 100, 200, 400 and/or 500.

Referring to FIG. 6B, in some implementations, the exemplary neural network environments 100, 200, 400 and/or 500 may reduce or minimize by populating a plurality of kernels 608, 610 and 612 with weight values (i.e., A, B, C, D, E, F and H) held in the same respective weight value holding positions across the plurality of kernels 608, 610 and 612. In some implementations, populating the plurality of kernels 608, 610 and 612 with weight values may occur at the time the plurality of kernels 608, 610 and 612 are initially generated by the exemplary neural network environments 100, 200, 400 and/or 500. In other implementations, the exemplary neural network environments 100, 200, 400 and/or 500 may analyze a plurality of kernels associated with the exemplary neural network environments 100, 200, 400 and/or 500 and perform a weight swapping operation to generate a plurality of kernels (e.g., the plurality of kernels 608-612) that include the same weight values positioned in the same weight value holding positions across respective ones of the plurality of kernels.

Turning now to FIG. 7, aspects of a routine 700 related to reducing bit flipping and providing power consumption reduction in a neural network environment are described. It should be understood that the operations of the methods (e.g., routines) disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. Furthermore, it is to be understood that the routine 700 may be implemented by one or more of the elements and components illustrated in FIGS. 1-6B and 8-9 and the related description of those figures.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The operations of the routine 700 are described herein as being implemented, at least in part, by an application, component and/or circuit, such as one or more of the operational elements of the neural network environments described herein. In some configurations, the neural network environments may implement a compiled program, an interpreted program, a script or any other executable set of instructions. One or more of the implemented compiled program, interpreted program, script or any other executable set of instructions may be executed by at least one processor to cause one or more of the operations of the routine 700 to operate.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by an application, component and/or circuit, such as the one or more of the elements associated with the described neural network environments. Although the following illustration may refer to the components or elements of FIGS. 1-6B and 8-9 it can be appreciated that the operations of the routine 700 may also be implemented in many other ways. In addition, one or more of the operations of the routine 700 may alternatively or additionally be implemented, at least in part, by a chipset working alone or in conjunction with other software modules. Any service, circuit or application suitable for providing the techniques disclosed herein can be used in operations described herein.

At block 702, a first storage, such as a buffer or line buffer 402, is provided with at least one input data value. The storage may be provided with a plurality of input data values. At block 704, the at least one input data value is provided to at least one processing unit, such as a neuron 406 of a neural network environment 400.

At block 706, a plurality of kernel weight values are stored in a second storage of, for example, the neural network environment 400. The second storage may be a buffer or staging buffer 404.

At block 708, perform an operation on the at least one input data value provided to the at least one processing unit, the operation including at least multiplying a first weight value of the plurality of kernel weight values with the at least one input data value to provide a first weighted data value and multiplying a second weight value of the plurality of kernel weight values with the at least one input data value to provide a second weighted data value.

At block 710, the first and second weighted data values are stored in a storage (e.g., memory) associated with the neural network environment 400. In some implementations, the first and second weighted data values are stored in an aggregator associated with the neural network environment 400 and thereby aggregated by the neural network environment 400.

At block 712, a check is then performed to determine if there is additional input data to be processed (i.e., as part of an iteration operation). If there is no additional input data, processing terminates at block 714. However, if additional input data requires an iteration operation, processing then reverts to block 704 and proceeds from there until no further input data remains to be processed.

The computer architecture 800 illustrated in FIG. 8 includes at least one computing environment 805 that may include a central processing unit 802 ("CPU"), a system memory 804, including a random-access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 814, other data, and one or more application programs.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes of the claims, the phrase "computer storage medium," "computer-readable storage medium" and variations thereof, does not include waves, signals, and/or other transitory and/or intangible communication media, per se.

According to various techniques, the computer architecture 800 may operate in a networked environment using logical connections to remote computers 805 through a network 820 and/or another network (not shown). The computer architecture 800 may connect to the network 820 through a network interface unit 816 connected to the bus 810. It should be appreciated that the network interface unit 816 also may be utilized to connect to other types of networks and remote computer systems. The computer architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8). It should also be appreciated that via a connection to the network 820 through a network interface unit 816, the computing architecture may enable DNN module 105 to communicate with the environment as disclosed herein.

It should be appreciated that the software components described herein may, when loaded into the CPU 802 and/or the DNN Module 105 and executed, transform the CPU 802 and/or the DNN Module 105 and the overall computer architecture 800 from a general-purpose computing system into a special-purpose computing system customized to facilitate the functionality presented herein. The CPU 802 and/or the DNN Module 105 may be constructed from any number of transistors or other discrete circuit elements and/or chipset, which may individually or collectively assume any number of states. More specifically, the CPU 802 and/or the DNN Module 105 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Computing system 800, described above, can be deployed as part of a computer network. In general, the above description for computing environments applies to both server computers and client computers deployed in a network environment.

FIG. 9 illustrates an exemplary illustrative networked computing environment 900, with a server in communication with client computers via a communications network, in which the herein described apparatus and methods may be employed. As shown in FIG. 9, server(s) 905 may be interconnected via a communications network 720 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing environments such as a tablet personal computer 910, a mobile telephone 915, a telephone 920, a personal computer(s) 801, a personal digital assistant 925, a smart phone watch/personal goal tracker (e.g., Apple Watch, Samsung, FitBit, etc.) 930, and a smart phone 935. In a network environment in which the communications network 820 is the Internet, for example, server(s) 905 can be dedicated computing environment servers operable to process and communicate data to and from client computing environments 805, 910, 915, 920, 925, 930, and 935 via any of a number of known protocols, such as, hypertext transfer protocol (HTTP), file transfer protocol (FTP), simple object access protocol (SOAP), or wireless application protocol (WAP). Additionally, the networked computing environment 900 can utilize various data security protocols such as secured socket layer (SSL) or pretty good privacy (PGP). Each of the client computing environments 805, 910, 915, 920, 925, 930, and 935 can be equipped with operating system 814 operable to support one or more computing applications or terminal sessions such as a web browser (not shown), or other graphical user interface (not shown), or a mobile desktop environment (not shown) to gain access to the server computing environment(s) 905.

Server(s) 905 may be communicatively coupled to other computing environments (not shown) and receive data regarding the participating user's interactions/resource network. In an illustrative operation, a user (not shown) may interact with a computing application running on a client computing environment(s) to obtain desired data and/or computing applications. The data and/or computing applications may be stored on server computing environment(s) 905 and communicated to cooperating users through client computing environments 805, 910, 915, 920, 925, 930, and 835, over an exemplary communications network 820. A participating user (not shown) may request access to specific data and applications housed in whole or in part on server computing environment(s) 905. These data may be communicated between client computing environments 805, 910, 915, 920, 925, 930, 935 and server computing environment(s) 905 for processing and storage. Server computing environment(s) 905 may host computing applications, processes and applets for the generation, authentication, encryption, and communication of data and applications and may cooperate with other server computing environments (not shown), third party service providers (not shown), network attached storage (NAS) and storage area networks (SAN) to realize application/data transactions.

The disclosure presented herein may be considered in view of the following examples.

Example 1. A system for data processing in a network environment, the system comprising: at least one processor; a first storage operable to store at least one input data value and provide the at least one input data value to at least one processing unit; a second storage to store first and second weight values; and at least one memory in communication with the at least one processor, the at least one memory having computer-readable instructions stored thereupon that, when executed by the at least one processor, cause the at least one processor to: retrieve the first weight value associated with a first kernel of the network environment; retrieve the second weight value associated with a second kernel of the network environment; store the first and second weight values in the second storage; perform an operation on the at least one input data value provided to the at least one processing unit, the operation involving the first weight value and the at least one input data value to provide a first weighted data value and involving the second weight value and the at least one input data value to provide a second weighted data value; and store the first and second weighted data values.

Example 2. The system of example 1, wherein the network environment is a neural network environment and the at least one processing unit is at least one neuron of the neural network environment.

Example 3. The system of Example 1, wherein the computer-readable instructions further cause the at least one processor to aggregate the stored first and second weighted data values.

Example 4. The system of Example 1, wherein each of the first and second kernels of the network environment include a plurality of weight value holding positions each holding a weight value, the first weight value associated with a first holding position of the first kernel and the second weight value associated with a first holding position of the second kernel, the first and second kernels of the network environment including weight values arranged as part of a training process associated with the network environment to reduce bit flipping associated with the network environment.

Example 5. The system of Example 4, wherein the first holding position of the first kernel is spatially equivalent to the first holding position of the second kernel.

Example 6. The system of Example 1, wherein the system comprises a plurality of kernels including at least the first and second kernels, the computer-readable instructions further cause the at least one processor to consecutively store the first and second kernels based on weight values held in the first and second kernels.

Example 7. The system of Example 6, wherein each of the first and second kernels of the network environment include a plurality of weight value holding positions each holding a weight value, and the computer-readable instructions further cause the at least one processor to allocate equal weight values to the same weight value holding positions of each of the first and second kernels to reduce bit flipping associated with the network environment.

Example 8. The system of Example 1, wherein the computer-readable instructions further cause the at least one processor to interleave weight values associated with a plurality of kernels of the network environment and store the interleaved weight values to provide a set of interleaved weight values, the first weight value and the second weight value included in the set of interleaved weight values.

Example 9. A computer-implemented method, comprising: retrieving a first weight value associated with a first kernel of a network environment; retrieving a second weight value associated with a second kernel of the network environment; storing the first and second weight values; performing an operation on at least one input data value held in at least one processing unit, the operation including at least a multiplying, summing, subtracting, dividing, or maxing applied to the first weight value and the at least one input data value to provide a first weighted data value and at least a multiplying, summing, subtracting, dividing, or maxing applied to the second weight value and the at least one input data value to provide a second weighted data value; and storing the first and second weighted data values for further processing by the network environment.

Example 10. The computer-implemented method of Example 9, wherein the network environment is a neural network environment and the at least one processing unit is at least one neuron of the neural network environment.

Example 11. The computer-implemented method of Example 9, comprising aggregating the stored first and second weighted data values to provide data for further processing by the network environment.

Example 12. The computer-implemented method of Example 9, wherein each of the first and second kernels of the network environment include a plurality of weight value holding positions each holding a weight value, the first weight value associated with a first holding position of the first kernel and the second weight value associated with a first holding position of the second kernel.

Example 13. The computer-implemented method of Example 12, wherein the first holding position of the first kernel is spatially equivalent to the first holding position of the second kernel.

Example 14. The computer-implemented method of Example 9, wherein the network environment comprises a plurality of kernels including at least the first and second kernels, the first and second kernels disposed consecutively within at least one storage associated with the network environment.

Example 15. The computer-implemented method of Example 14, wherein each of the first and second kernels of the network environment include a plurality of weight value holding positions each holding a weight value, and wherein the method comprises consecutively storing the first and second kernels based on one or more weight values held by the first and second kernels.

Example 16. The computer-implemented method of Example 9, comprising interleaving weight values associated with a plurality of kernels of the network environment and storing the interleaved weight values to provide a set of interleaved weight values, the first weight value and the second weight value included in the set of interleaved weight values.

Example 17. A computer-readable storage medium having computer-executable instructions stored thereupon which, when executed by one or more processors of a computing device, cause the one or more processors of the computing device to: retrieve a first weight value associated with a first kernel stored in a kernel storage associated with a neural network environment; retrieve a second weight value associated with a second kernel stored in the storage associated with the network environment, the second kernel stored in the kernel storage immediately preceding or following the first kernel stored in the kernel storage associated with the neural network environment; store the first and second weight values in a staging buffer associated with the neural network environment; perform an operation on at least one input data value held in a neuron of the neural network environment, the operation including at least a multiplying, summing, subtracting, dividing, or maxing applied to the first weight value and the at least one input data value to provide a first weighted data value and a multiplying, summing, subtracting, dividing, or maxing applied to the second weight value and the at least one input data value to provide a second weighted data value; and store the first and second weighted data values in a storage associated with the neural network environment.

Example 18. The computer-readable storage medium of Example 17, wherein each of the first and second kernels of the neural network environment include a plurality of weight value holding positions each holding a weight value, the first weight value associated with a first holding position of the first kernel and the second weight value associated with a first holding position of the second kernel.

Example 19. The computer-readable storage medium of Example 18, wherein the first holding position of the first kernel is spatially equivalent to the first holding position of the second kernel.

Example 20. The computer-readable storage medium of Example 17, wherein the neural network environment comprises a plurality of kernels including at least the first and second kernels, the first and second kernels disposed consecutively within kernel storage associated with a neural network environment.

Example 21. The computer-readable storage medium of Example 20, wherein each of the first and second kernels of the neural network environment include a plurality of weight value holding positions each holding a weight value, and wherein the computer-executable instructions, when executed by one or more processors of the computing device, cause the one or more processors of the computing device to consecutively store the first and second kernels based on one or more weight values held by the first and second kernels.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for processing data and generating output while reducing power consumption in a neural network, the system comprising:
    at least one processor; and
    at least one memory in communication with the at least one processor, the at least one memory having computer-readable instructions stored thereupon that, when executed by the at least one processor, cause the at least one processor to:
    storing first and second weight values and at least one input data value in one or more storage devices;
    reordering the first and second weight values and the at least one input data value to reduce bit flipping associated with the neural network during execution of an operation;
    perform the operation on the reordered at least one input data value and first weight value to generate a first weighted data value;
    perform the operation on the reordered at least one input data value and second weight value to generate a second weighted data value; and
    output the first and second weighted data values for further processing by the neural network.

2. The system of claim 1, wherein the reordering is based on determining that at least a portion of the first and second weight values have common bit values.

3. The system of claim 1, wherein the computer-readable instructions further cause the at least one processor to aggregate the stored first and second weighted data values.

4. The system of claim 1, wherein the first weight value is associated with a first kernel of the neural network and the second weight value is associated with a second kernel of the neural network, each of the first and second kernels including a plurality of weight value holding positions each holding a weight value, the first weight value associated with a first holding position of the first kernel and the second weight value associated with a first holding position of the second kernel, the first and second kernels including weight values arranged as part of a training process to reduce bit flipping associated with the neural network.

5. The system of claim 4, wherein the first holding position of the first kernel is spatially equivalent to the first holding position of the second kernel.

6. The system of claim 4, wherein the system comprises a plurality of kernels including at least the first and second kernels, the computer-readable instructions further cause the at least one processor to consecutively store the first and second kernels based on weight values held in the first and second kernels.

7. The system of claim 6, wherein each of the first and second kernels include a plurality of weight value holding positions each holding a weight value, and the computer-readable instructions further cause the at least one processor to allocate equal weight values to the same weight value holding positions of each of the first and second kernels to reduce bit flipping associated with the neural network.

8. The system of claim 1, wherein the computer-readable instructions further cause the at least one processor to interleave weight values associated with a plurality of kernels of the neural network and store the interleaved weight values to provide a set of interleaved weight values, the first weight value and the second weight value included in the set of interleaved weight values.

9. A computer-implemented method for processing data and generating output while reducing power consumption in a neural network, the method comprising:
    storing a first weight value, a second weight value, and at least one input data value;
    reordering the first and second weight values and the at least one input data value in one or more storage devices to reduce bit flipping associated with the neural network during execution of an operation;
    performing the operation on a neuron of the neural network, the operation performed on the at least one input data value and the first and second weight values, the operation including at least one of multiplying, summing, subtracting, dividing, or maxing applied to the first and second weight value and the at least one input data value to generate a first and second weighted data value; and
    storing the first and second weighted data values for further processing by the neural network.

10. The computer-implemented method of claim 9, wherein the reordering is based on determining that at least a portion of the first and second weight values have common bit values.

11. The computer-implemented method of claim 9, comprising aggregating the stored first and second weighted data values to provide data for further processing by the neural network.

12. The computer-implemented method of claim 9, wherein the first weight value is associated with a first kernel of the neural network and the second weight value is associated with a second kernel of the neural network, each of the first and second kernels including a plurality of weight value holding positions each holding a weight value, the first weight value associated with a first holding position of the first kernel and the second weight value associated with a first holding position of the second kernel, the first and second kernels including weight values arranged as part of a training process to reduce bit flipping associated with the neural network.

13. The computer-implemented method of claim 12, wherein the first holding position of the first kernel is spatially equivalent to the first holding position of the second kernel.

14. The computer-implemented method of claim 12, wherein the neural network comprises a plurality of kernels including at least the first and second kernels, the first and second kernels disposed consecutively within at least one storage associated with the neural network.

15. The computer-implemented method of claim 14, wherein each of the first and second kernels of the neural network include a plurality of weight value holding positions each holding a weight value, and wherein the method comprises consecutively storing the first and second kernels based on one or more weight values held by the first and second kernels.

16. The computer-implemented method of claim 9, comprising interleaving weight values associated with a plurality of kernels of the neural network and storing the interleaved weight values to provide a set of interleaved weight values, the first weight value and the second weight value included in the set of interleaved weight values.

17. A computer-readable storage medium having computer-executable instructions stored thereupon which, when executed by one or more processors of a computing device, cause the one or more processors of the computing device to:
store a first weight value and a second weight value associated with a second kernel stored in a staging buffer associated with a neural network, wherein the first weight value and second weight value are stored so as to reduce bit flipping associated with the neural network during execution of an operation;
perform the operation on at least one input data value held in a neuron of the neural network, the operation including at least one of multiplying, summing, subtracting, dividing, or maxing applied to the first weight value and the at least one input data value to provide a first weighted data value and at least one of multiplying, summing, subtracting, dividing, or maxing applied to the second weight value and the at least one input data value to provide a second weighted data value; and
store the first and second weighted data values in a storage associated with the neural network.

18. The computer-readable storage medium of claim 17, wherein:
the first weight value is associated with a first kernel stored in a kernel storage associated with the neural network;
the second weight value is associated with a second kernel stored in the storage associated with the neural network, the second kernel stored in the kernel storage immediately preceding or following the first kernel stored in the kernel storage associated with the neural network; and
each of the first and second kernels of the neural network include a plurality of weight value holding positions each holding a weight value, the first weight value associated with a first holding position of the first kernel and the second weight value associated with a first holding position of the second kernel.

19. The computer-readable storage medium of claim 18, wherein the first holding position of the first kernel is spatially equivalent to the first holding position of the second kernel.

20. The computer-readable storage medium of claim 18, wherein:
the neural network comprises a plurality of kernels including at least the first and second kernels, the first and second kernels disposed consecutively within kernel storage associated with a neural network; and
each of the first and second kernels of the neural network include a plurality of weight value holding positions each holding a weight value, and wherein the computer-executable instructions, when executed by one or more processors of the computing device, cause the one or more processors of the computing device to consecutively store the first and second kernels based on one or more weight values held by the first and second kernels.

* * * * *